United States Patent
Luechinger et al.

(10) Patent No.: US 10,882,134 B2
(45) Date of Patent: Jan. 5, 2021

(54) ULTRASONIC WELDING SYSTEMS AND METHODS OF USING THE SAME

(71) Applicant: Kulicke and Soffa Industries,Inc., Fort Washington, PA (US)

(72) Inventors: Christoph B. Luechinger, Irvine, CA (US); Orlando L. Valentin, Aliso Viejo, CA (US)

(73) Assignee: Kulicke and Soffa Industries, Inc., Fort Washington, PA (US)

( * ) Notice: Subject to any disclaimer, the term of this patent is extended or adjusted under 35 U.S.C. 154(b) by 241 days.

(21) Appl. No.: 16/321,635

(22) PCT Filed: Apr. 3, 2018

(86) PCT No.: PCT/US2018/025941
§ 371 (c)(1),
(2) Date: Jan. 29, 2019

(87) PCT Pub. No.: WO2018/187364
PCT Pub. Date: Oct. 11, 2018

(65) Prior Publication Data
US 2020/0290148 A1 Sep. 17, 2020

Related U.S. Application Data

(60) Provisional application No. 62/481,408, filed on Apr. 4, 2017.

(51) Int. Cl.
*B23K 20/10* (2006.01)
*B23K 20/26* (2006.01)
(Continued)

(52) U.S. Cl.
CPC ............ *B23K 20/106* (2013.01); *B23K 20/26* (2013.01); *B23K 37/047* (2013.01); *B23K 37/0435* (2013.01); *B23K 2101/36* (2018.08)

(58) Field of Classification Search
CPC .............................. B23K 37/04; B23K 20/12; B23K 20/20–106; B23K 1/06; B23K 20/26;
(Continued)

(56) References Cited

U.S. PATENT DOCUMENTS 4,301,958 A * 11/1981 Hatakenaka ...... H01L 21/67144
228/4.5
4,872,052 A * 10/1989 Liudzius .............. G01N 21/956
348/126
(Continued)

FOREIGN PATENT DOCUMENTS

JP 55030810 A * 3/1980 ............ H01L 24/78
JP 02012848 A * 1/1990
(Continued)

OTHER PUBLICATIONS

International Search Report dated Aug. 6, 2018, International Application No. PCT/US2018/025941.

*Primary Examiner* — Kiley S Stoner
(74) *Attorney, Agent, or Firm* — Christopher M. Spletzer, Sr.

(57) ABSTRACT

An ultrasonic welding system is provided. The ultrasonic welding system includes a support structure for supporting a workpiece. The ultrasonic welding system also includes a weld head assembly including an ultrasonic converter carrying a sonotrode. The weld head assembly is moveable along a plurality of substantially horizontal axes. The sonotrode is configured to operate during a welding operation at a bond force of between 5-500 kg, and with a sonotrode tip motion amplitude of between 5-150 microns.

10 Claims, 5 Drawing Sheets

(51) Int. Cl.
*B23K 37/04* (2006.01)
*B23K 37/047* (2006.01)
*B23K 101/36* (2006.01)

(58) Field of Classification Search
CPC .............. B23K 37/0435; B23K 37/047; B23K 2101/36; B29C 65/08; B29C 65/645
USPC .................. 228/1.1, 110.1; 156/580.1–580.2
See application file for complete search history.

(56) References Cited

U.S. PATENT DOCUMENTS

| | | | | |
|---|---|---|---|---|
| 5,884,831 | A * | 3/1999 | Sato .................... | B23K 20/10 228/6.2 |
| 6,045,318 | A * | 4/2000 | Mochida ........... | H01L 21/67778 414/609 |
| 6,820,792 | B2 * | 11/2004 | Kim .................. | H01L 21/67144 228/105 |
| 7,568,606 | B2 * | 8/2009 | Wong ................ | H01L 21/67144 228/43 |
| 10,096,570 | B2 | 10/2018 | Yoneda et al. | |
| 2001/0005602 | A1 * | 6/2001 | Mimata ............. | H01L 21/67144 438/107 |
| 2004/0149803 | A1 * | 8/2004 | Imanishi ........... | H01L 21/67288 228/8 |
| 2005/0145306 | A1 * | 7/2005 | Statnikov ............. | B23K 20/106 148/508 |
| 2006/0071054 | A1 * | 4/2006 | Bolser .................... | B23K 20/10 228/124.6 |
| 2006/0169388 | A1 | 8/2006 | Shimizu et al. | |
| 2008/0265004 | A1 | 10/2008 | Stroh | |
| 2009/0126188 | A1 * | 5/2009 | Sakai .................... | H01L 24/83 29/832 |
| 2012/0012645 | A1 * | 1/2012 | Motomura ............ | H05K 3/363 228/179.1 |
| 2013/0049201 | A1 * | 2/2013 | Yoshida ................ | H01L 25/072 257/751 |
| 2013/0112735 | A1 | 5/2013 | Luechinger et al. | |
| 2013/0145597 | A1 * | 6/2013 | Kodama ........... | G05B 19/41805 29/428 |
| 2013/0221504 | A1 * | 8/2013 | Schulz ............. | H01L 23/49517 257/668 |
| 2014/0110833 | A1 * | 4/2014 | Yoo ........................ | H01L 23/049 257/697 |
| 2014/0157591 | A1 * | 6/2014 | Nagai ................ | H05K 13/0817 29/739 |
| 2015/0210003 | A1 | 7/2015 | Short et al. | |
| 2016/0133712 | A1 | 5/2016 | Yoneda et al. | |
| 2016/0300770 | A1 * | 10/2016 | Taya ....................... | H01L 24/84 |
| 2017/0141011 | A1 * | 5/2017 | Oohiraki .................. | B32B 7/04 |
| 2017/0154855 | A1 * | 6/2017 | Oi ...................... | H01L 23/3114 |
| 2017/0170091 | A1 * | 6/2017 | Kim .................... | H01L 24/40 |
| 2017/0214064 | A1 * | 7/2017 | Lex ..................... | H01M 8/1039 |
| 2017/0221853 | A1 * | 8/2017 | Yoneyama .............. | H01L 24/37 |
| 2017/0338190 | A1 * | 11/2017 | Fujino ................. | H01L 25/072 |
| 2017/0374755 | A1 * | 12/2017 | Chi ..................... | H01L 23/053 |
| 2018/0076167 | A1 * | 3/2018 | Chuang .................. | H01L 21/48 |

FOREIGN PATENT DOCUMENTS

| | | |
|---|---|---|
| JP | 2007-005474 | 1/2007 |
| JP | 2014-056917 | 3/2014 |
| JP | 2017-024040 | 2/2017 |
| WO | WO2016-199621 | 12/2016 |

\* cited by examiner

ULTRASONIC WELDING SYSTEMS AND METHODS OF USING THE SAME

CROSS-REFERENCE TO RELATED APPLICATION

This application claims the benefit of International PCT Application No. PCT/US2018/025941 filed Apr. 3, 2018, which claims the benefit of U.S. Provisional Application No. 62/481,408, filed Apr. 4, 2017, the content of both of which are incorporated herein by reference in its entirety.

FIELD

The invention relates to the ultrasonic welding, and more particularly, to improved systems and methods for performing ultrasonic welding operations.

BACKGROUND

Ultrasonic energy is widely used in forming interconnections between two or more materials. For examples, wire bonding machines (e.g., ball bonding machines, wedge bonding machines, ribbon bonding machines, etc.) are used to bond a wire or ribbon to a bonding location. However, wire bonding utilizes relatively low levels of energy (e.g., bond force, ultrasonic energy, etc.). Exemplary wire bonding machines are marketed by Kulicke and Soffa Industries, Inc. of Fort Washington, Pennsylvania.

Certain applications involve joining of materials other than wire. Welding has been considered for such applications. Ultrasonic welding is also a widely used technology. Ultrasonic welding may use an ultrasonic converter (e.g., carrying a sonotrode) for converting electrical energy into mechanical movement/scrub (e.g., linear movement/scrub, torsional movement/scrub, etc.). However, existing ultrasonic welding technology and equipment is limited in its ability to provide solutions that can satisfy market demand in terms of cost, operational efficiency, flexibility, portability, and related factors.

Thus, it would be desirable to improve ultrasonic welding technology to overcome existing barriers to potential markets.

SUMMARY

According to another exemplary embodiment of the invention, an ultrasonic welding system is provided. The ultrasonic welding system includes a support structure for supporting a workpiece. The ultrasonic welding system also includes a weld head assembly including an ultrasonic converter carrying a sonotrode. The weld head assembly is moveable along a plurality of substantially horizontal axes. The sonotrode is configured to operate during a welding operation at a bond force of between 5-500 kg, and with a sonotrode tip motion amplitude of between 5-150 microns.

According to yet another exemplary embodiment of the invention, an ultrasonic welding system is provided. The ultrasonic welding system includes a support structure for supporting a workpiece. The ultrasonic welding system also includes a weld head assembly including an ultrasonic converter carrying a sonotrode. The weld head assembly is moveable along a plurality of substantially horizontal axes. The workpiece provided to the ultrasonic welding system includes a contact element and a base structure, wherein the sonotrode is configured to ultrasonically weld at least one conductive contact of the contact element to a respective conductive region of the base structure.

According to yet another exemplary embodiment of the invention, a method of operating an ultrasonic welding system is provided. The method includes the steps of: (a) supporting a workpiece on a support structure of the ultrasonic welding system; and (b) welding a first portion of the workpiece to a second portion of the workpiece using a weld head assembly including an ultrasonic converter carrying a sonotrode, the weld head assembly being moveable along a plurality of substantially horizontal axes, the sonotrode being configured to weld the first portion of the workpiece to the second portion of the workpiece during a welding operation at a bond force of between 5-500 kg, and with a sonotrode tip motion amplitude of between 5-150 microns.

According to yet another exemplary embodiment of the invention, another method of operating an ultrasonic welding system is provided. The method includes the steps of: (a) supporting a workpiece on a support structure of the ultrasonic welding system; and (b) welding (i) a conductive contact of a contact element of the workpiece to (ii) a respective conductive region of a base structure of the workpiece, using a weld head assembly including an ultrasonic converter carrying a sonotrode, the weld head assembly being moveable along a plurality of substantially horizontal axes.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

In accordance with the invention, ultrasonic welding capability is provided in welding systems (and corresponding methods) that may achieve efficient volume production. Aspects of the invention relate to cameras (e.g., for pattern recognition), process diagnostics, material handling and fixturing/clamping systems, cleaning (debris removal) systems, (optical) inspection systems, amongst others.

Figure 1:
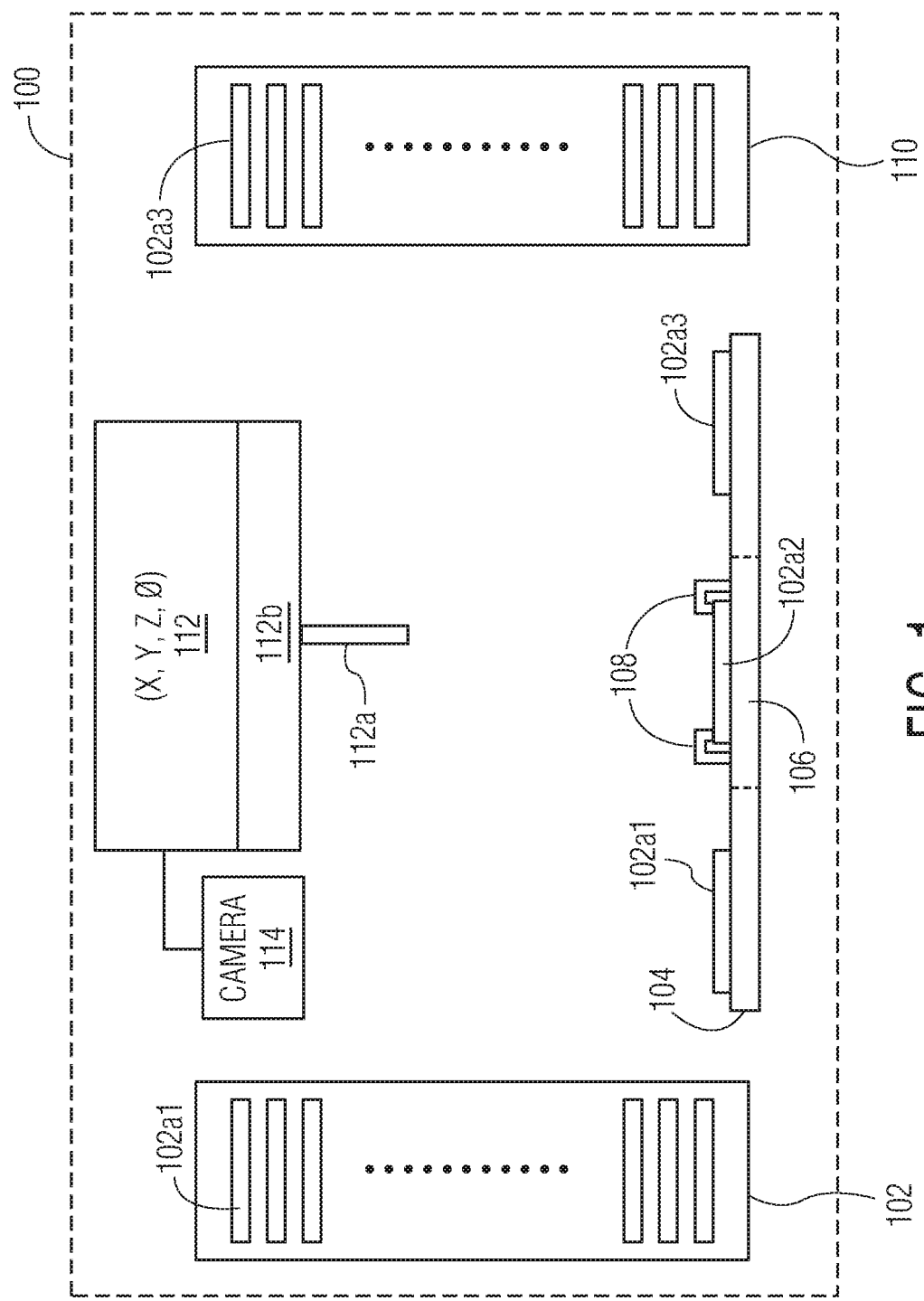
FIG. 1 is a block diagram side view of an ultrasonic welding system in accordance with an exemplary embodiment of the invention.

FIG. 1 illustrates an ultrasonic welding system 100. Ultrasonic welding system 100 includes an input workpiece supply 102 for providing a workpiece 102a1, where input workpiece supply 102 is configured to carry a plurality of workpieces 102a1 (e.g., supply 102 may be a carrier such as a magazine handler for carrying a plurality of workpieces 102a1, or other supply structure suitable for the application specific workpiece, etc.). Exemplary workpieces 102a1 carried by input workpiece supply 102 include power modules, components of power modules, lead frames, battery modules, etc. Workpieces 102a1 are provided (by any desired transport assembly which may be included in a material handling system 104, such as a gripper assembly) from input workpiece supply 102 to a material handling system 104. Material handling system 104 moves the workpiece 102a1 (e.g., using a conveyor assembly, using a gripper assembly, etc.) from the input workpiece supply 102 to the support structure 106. Support structure 106 supports the workpiece (now labelled as clamped workpiece 102a2, when clamped against support structure 106 using workpiece clamp 108) during a welding operation. After the welding operation (described below with respect to weld head assembly 112), the now welded workpiece 102a3 is moved (e.g., using a conveyor assembly, using a gripper assembly, etc.) from a portion of material handling 104 downstream of support structure 106, to an output workpiece supply 110. Output workpiece supply 110 is configured to receive workpieces 102a3 after processing by weld head assembly 112 (where weld head assembly 112 includes an ultrasonic converter 112b carrying a sonotrode 112a). Output workpiece supply 110 may be a carrier such as a magazine handler for carrying a plurality of welded workpieces 102a3, or other supply structure suitable for the application specific workpiece.

Ultrasonic welding system 100 includes a weld head assembly 112. Weld head assembly includes an ultrasonic converter 112b carrying a sonotrode 112a, and is moveable along a plurality of substantially horizontal axes. In the example shown in FIG. 1, weld head assembly 112 is configured to move along the x-axis and the y-axis of ultrasonic welding system 100 (see example x-axis and y-axis on FIG. 2). In the example shown in FIG. 1, weld head assembly 112 is also configured to move along the z-axis of ultrasonic welding system 100, and about a theta axis (Ø-axis) of ultrasonic welding system 100. Using the motion axes of weld head assembly 112, sonotrode 112a is able to be moved into proper welding positions with respect to clamped workpiece 102a2. Camera 114 is also provided (where camera may optionally be carried by weld head assembly 112, or may be carried by another part of ultrasonic welding system 100) for imaging operations related to the alignment between sonotrode 112a and clamped workpiece 102a2, the alignment of the components of clamped workpiece 102a2 in itself, optical inspection of the welds after welding operation, etc.

According to certain exemplary embodiments of the invention, during the welding operations, exemplary technical specifications include: (i) the sonotrode being configured to operate at a bond force of between 5-500 kg, or the sonotrode being configured to operate at a bond force of between 5-300 kg, or the sonotrode being configured to operate at a bond force of between 5-100 kg; (ii) the sonotrode tip motion amplitude being between 5-150 microns, or the sonotrode tip motion amplitude being between 5-120 microns, or the sonotrode tip motion amplitude being between 5-100 microns; (iii) the sonotrode being configured to form an ultrasonic weld between a first portion of a workpiece and a second portion of a workpiece having an area in a range between 1.5-30 $mm^2$; or the sonotrode being configured to form an ultrasonic weld between a first portion of a workpiece and a second portion of a workpiece having an area in a range between 1.5-20 $mm^2$; or the sonotrode being configured to form an ultrasonic weld between a first portion of a workpiece and a second portion of a workpiece having an area in a range between 1.5-16 $mm^2$; and (iv) the sonotrode being configured to operate at a frequency in a range between 15-40 kHz, or the sonotrode being configured to operate at a frequency in a range between 20-35 kHz, or the sonotrode being configured to operate at a frequency in a range between 20-30 kHz. Exemplary thicknesses of the conductive contact of the contact element (the part of the workpiece being contacted by the sonotrode) include: between 0.2-3 mm; 0.2-1.5 mm, and 0.2-1.2 mm.

Figure 2:
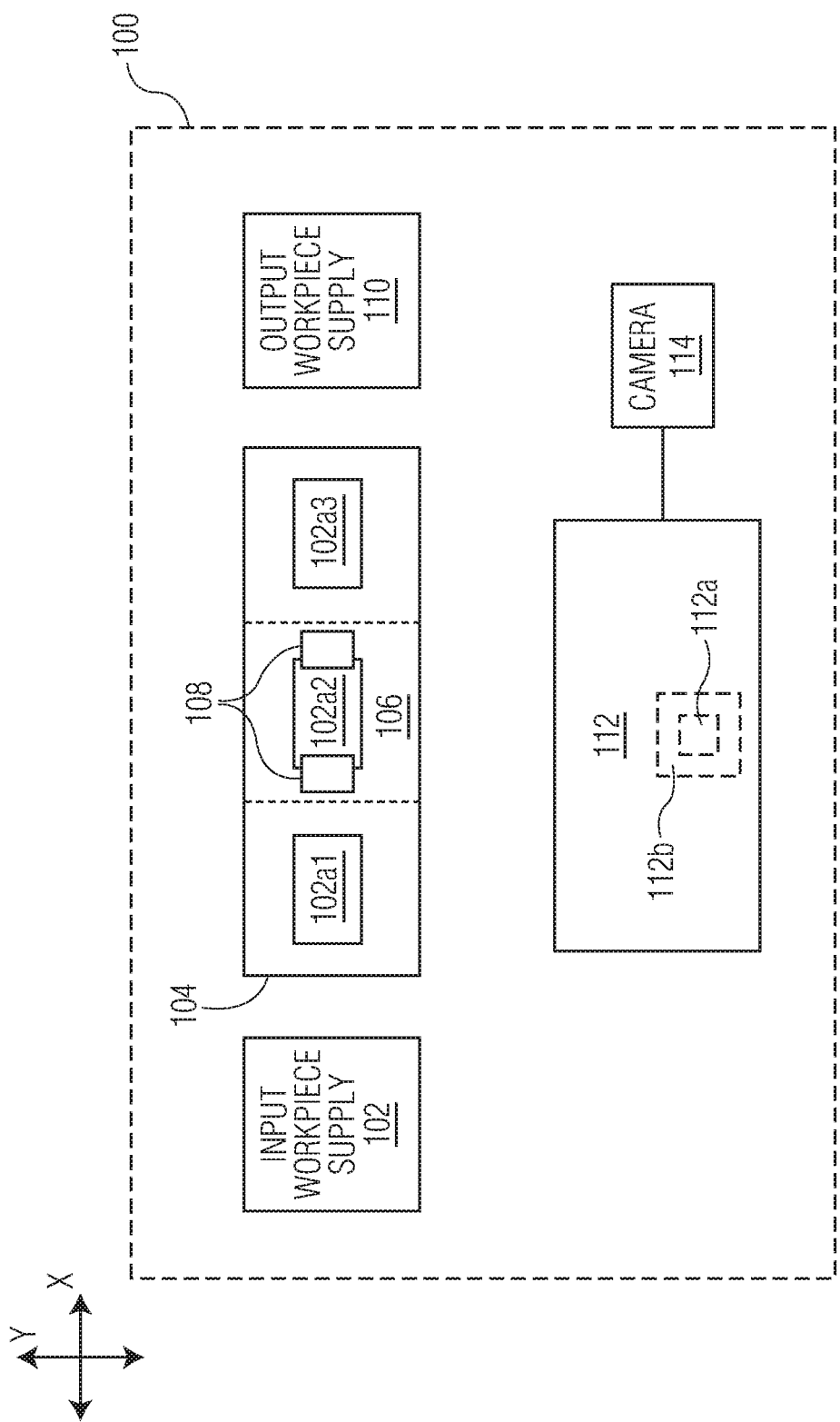
FIG. 2 is a block diagram top view of the ultrasonic welding system of FIG. 1.

FIG. 2 is an overhead view of the elements of ultrasonic welding system 100 shown in FIG. 1.

Figure 3A:
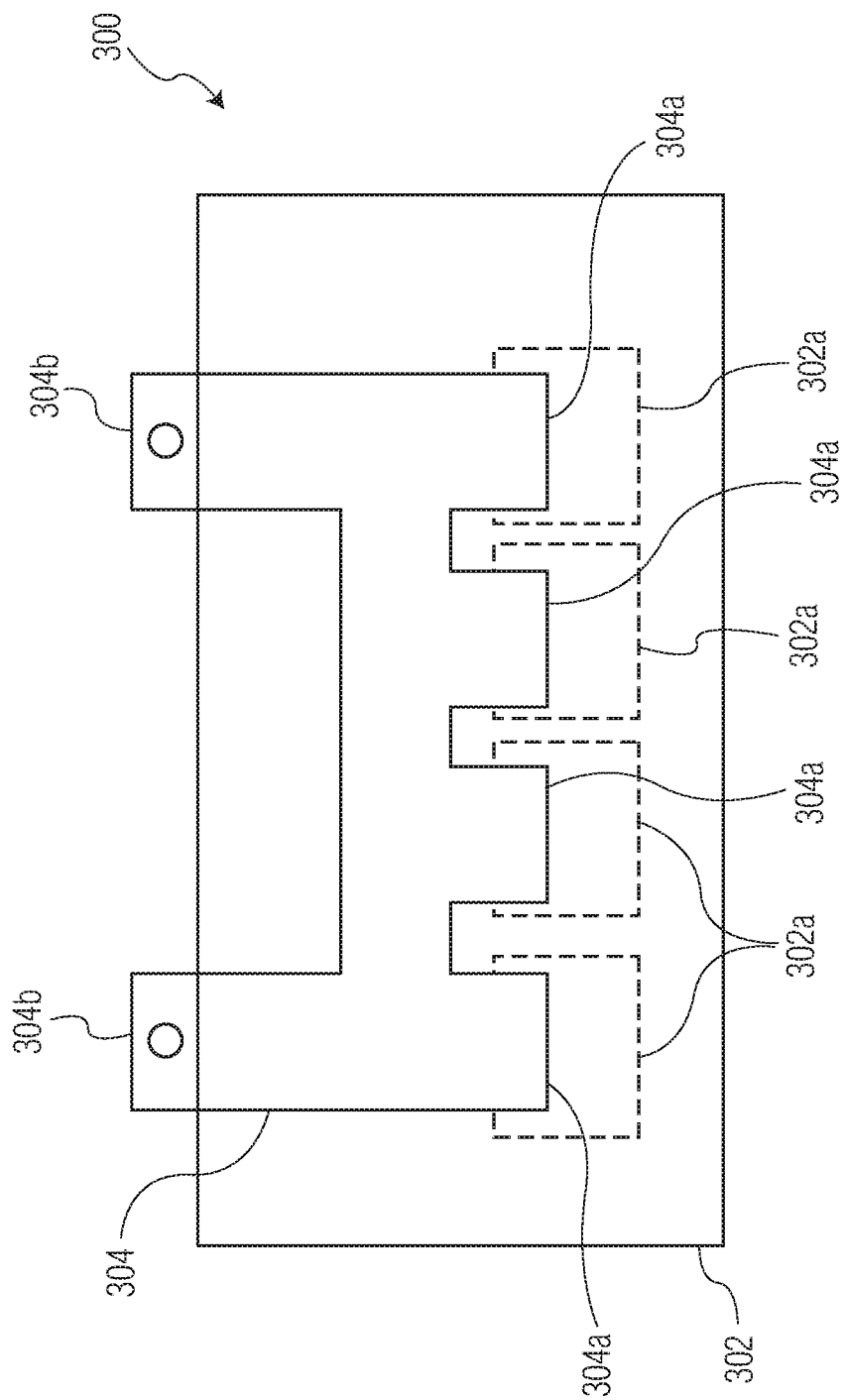
FIG. 3A is a block diagram top view of a workpiece configured for welding using ultrasonic welding systems in accordance with various exemplary embodiments of the invention.
Figure 3B:
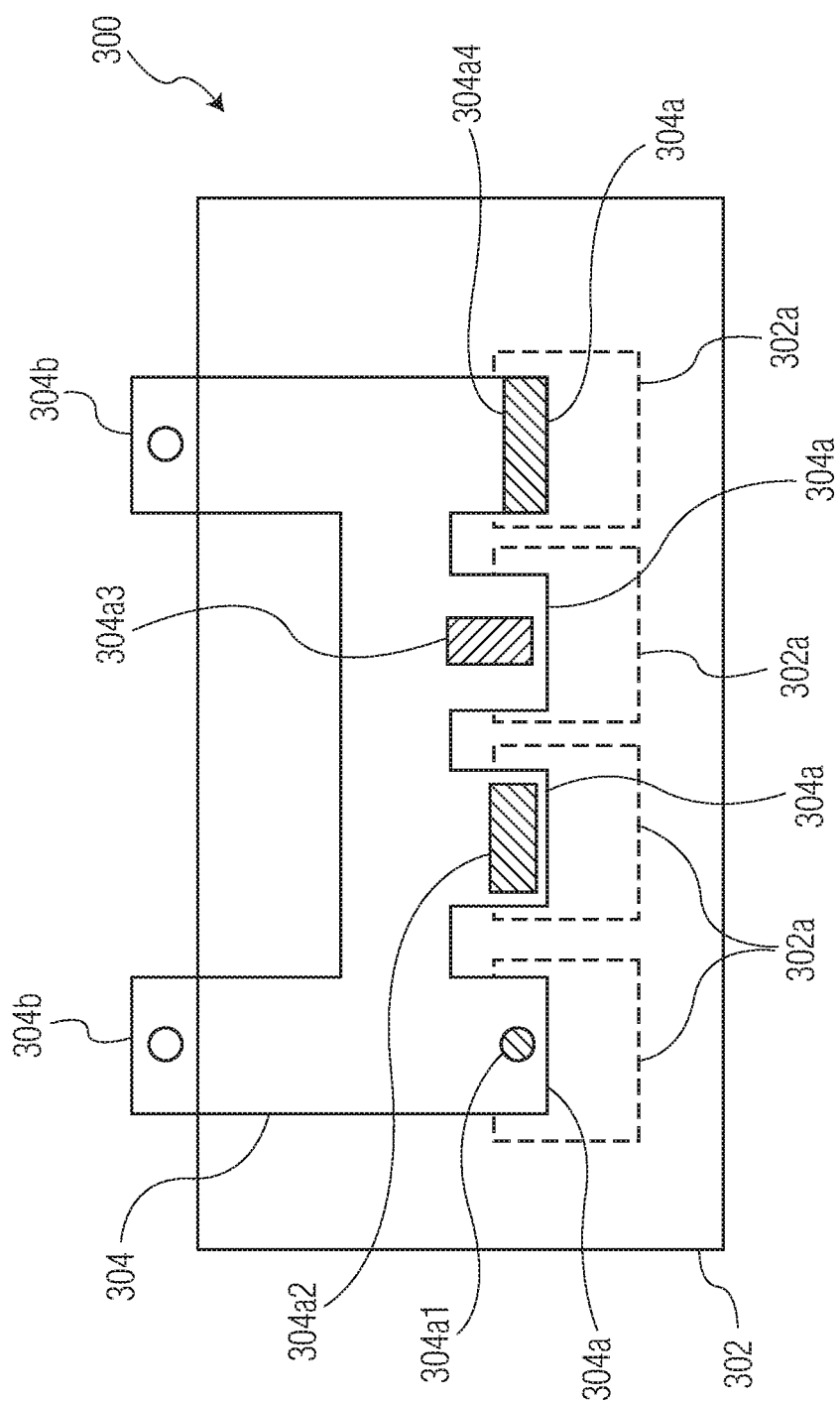
FIG. 3B is a block diagram top view of the workpiece of FIG. 3A including exemplary welded connections in accordance with various exemplary embodiments of the invention.

Various types of workpieces may be welded using ultrasonic welding system 100 (or other systems with the scope of the invention). Such workpieces may include a first portion of the workpiece configured to be welded to a second portion of the workpiece. FIGS. 3A-3B illustrate an example of such workpieces—where workpiece 300 of FIG. 3A is an example of workpiece 102a1 in FIG. 1. In the example of FIG. 3A, the first portion of the workpiece 300 is a contact element 304 including a plurality of conductive contacts 304a (and contact element 304 also includes external contacts 304b configured for connection to an external circuit), and the second portion of the workpiece is a base structure 302 including a plurality of conductive regions 302a. In the example of FIG. 3A, contact element 304 is already provided on base structure 302. Specifically, conductive contacts 304a are aligned with conductive regions 302a, and are ready for welding.

After positioning workpiece 300 on a support structure (e.g., support structure 106 of ultrasonic welding system 100 in FIG. 1), a sonotrode is used to form ultrasonic welds. FIG. 3B illustrates workpiece 300 from FIG. 3A, but with 4 examples of different ultrasonic welds having been formed. A first ultrasonic weld 304a1 is formed between a conductive contact 304a and a respective conductive region 302a, where ultrasonic weld 304a1 is formed using ultrasonic torsional motion (thereby forming a substantially round ultrasonic weld 304a1). Of course, other types of ultrasonic motion (other than torsional motion) are contemplated. For example, FIG. 3B illustrates a second ultrasonic weld 304a2 (formed using linear ultrasonic motion, for example, along an x-axis), and a third ultrasonic weld 304a3 (formed using linear ultrasonic motion, for example, along a y-axis that is substantially perpendicular to the x-axis). Ultrasonic welds 304a2 and 304a3 can also be formed by torsional ultrasonic motion (e.g., torsional ultrasonic motion may, of course, be used to form non-round ultrasonic welds). The fourth ultrasonic weld 304a4, formed using linear or torsional motion, covers the conductive contact area to three of its edges. Besides linear and torsional ultrasonic motion, combinations of both can be used.

Figure 4:
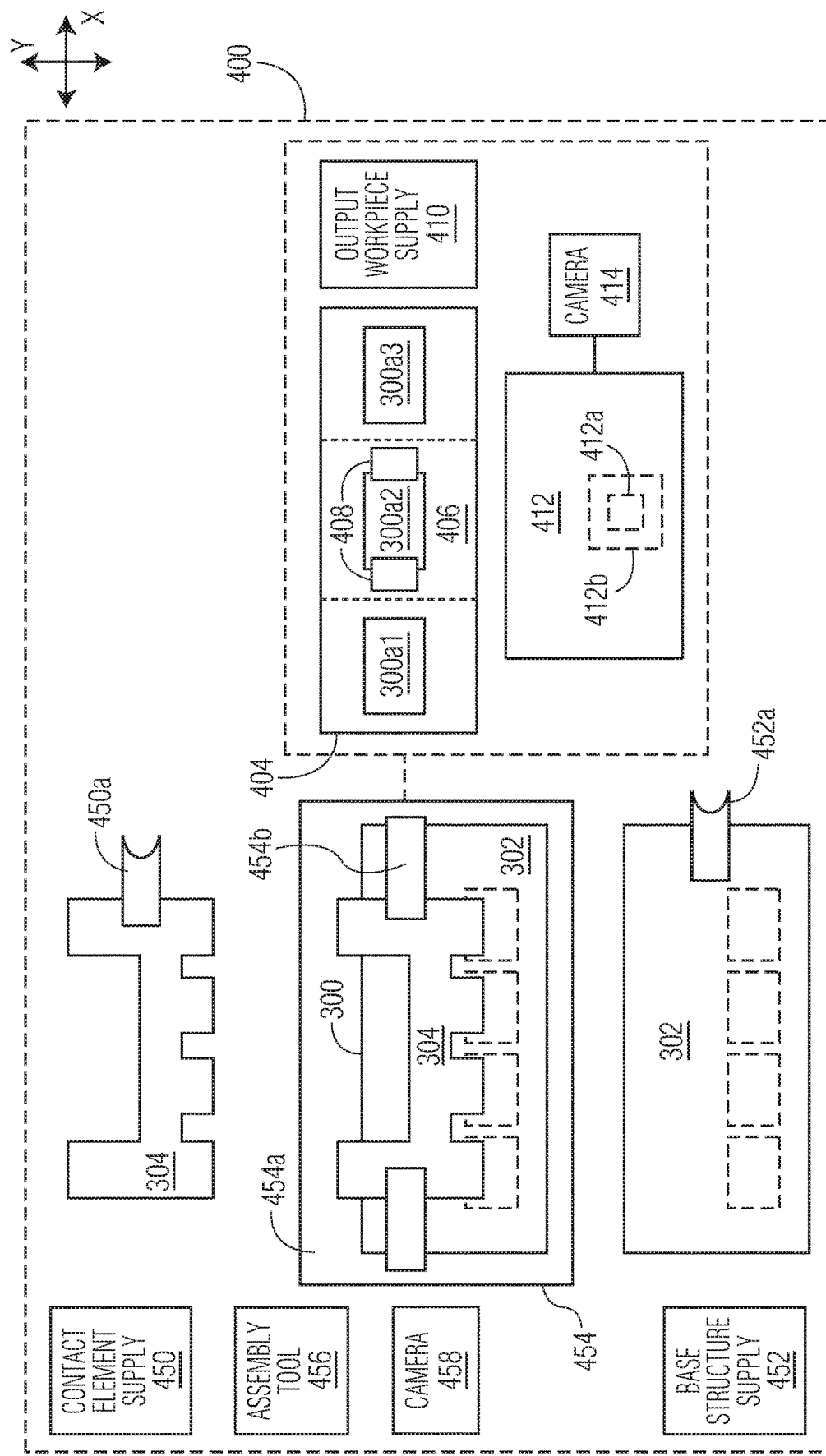
FIG. 4 is a block diagram top view of another ultrasonic welding system in accordance with another exemplary embodiment of the invention.

Referring again back to FIG. 1, input workpiece supply 102 includes workpieces 102a1 including each of a first portion and a second portion, already assembled together, and ready for welding. For example, workpieces 102a1 may be workpiece 300 from FIG. 3A including a first portion (contact element 304) assembled together with a second portion (base structure 302), and ready for welding. However, according to certain embodiments of the invention, the first portion of a workpiece (e.g., a contact element) may not be assembled together with the second portion (e.g., a base structure) at the start of processing by the ultrasonic welding system. FIG. 4 illustrates such a system.

Referring now to FIG. 4, ultrasonic welding system 400 includes a contact element supply 450 (e.g., a magazine or other supply including a plurality of contact elements 304) and a base structure supply 452 (e.g., a magazine or other supply including a plurality of base structures 302). Ultrasonic welding system 400 also includes a workpiece assembly station 454 for assembling contact elements 304 with respective base structures 452. More specifically, a base structure removal tool 452a removes a base structure 302 from base structure supply 452, and moves the base structure 302 to support structure 454a of workpiece assembly station 454. For example, base structure removal tool 452a may be a gripper type tool configured to move along the x-axis, the y-axis, and a z-axis. Likewise, a contact element removal tool 450a removes a contact element 304 from contact element supply 450, and moves the contact element 304 to support structure 454a (on top of base structure 302). For example, contact element removal tool 450a may be a gripper type tool configured to move along the x-axis, the y-axis, and a z-axis. Once aligned/assembled, assembly clamp 454b is used to keep contact element 300 positioned relative to base structure 302. Camera 458 may be used to help with and ensure proper alignment of contact element 304 to base structure 302. Assembly tool 456 may provide further assembly functions (e.g., pressing, adhesive distribution, etc.).

After processing (and assembly) at workpiece assembly station 454, the assembled workpiece 300 (now labelled as workpiece 304a1 in FIG. 4) is provided to material handling system 404 (substantially similar to material handling system 104 of FIG. 1). The workpiece 300 is then moved to support structure 406 (substantially similar to support structure 106 of FIG. 1). Workpiece clamp 408 (substantially similar to workpiece clamp 108 of FIG. 1) secures clamped workpiece 300a2 against support structure 406. Sonotrode 412a (substantially similar to sonotrode 112a of FIG. 1) is carried by ultrasonic converter 412b (where converter 412b is included in weld head assembly 412), and ultrasonically welds conductive contacts (of contact element 300 of workpiece 300a2) to conductive regions (of base structure 302 of workpiece 300a2), using camera 414 (substantially similar to camera 114 of FIG. 1) for alignment. After welding, the now welded workpiece 300a3 is moved to output workpiece supply 410 (substantially similar to output workpiece supply 110 of FIG. 1).

The operation of weld head assembly 412 of ultrasonic welding system 400 may be substantially similar to that described above with respect to weld head assembly 112 of ultrasonic welding system 100 of FIGS. 1-2. Further, the exemplary technical specifications described herein (e.g., the exemplary ranges for each of operational bond force of the sonotrode, sonotrode tip motion amplitude, ultrasonic weld area, and operational frequency of the sonotrode, conductive contact thicknesses, etc.) are equally applicable to the ultrasonic welding systems of FIGS. 1-2 and FIG. 4, as well as any other ultrasonic welding system within the scope of the invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of operating an ultrasonic welding system, the method comprising the steps of:
assembling a workpiece at a workpiece assembly station of the ultrasonic welding system, the workpiece comprising a power module, the step of assembling including aligning a contact element of the workpiece with a base structure of the workpiece;
supporting the workpiece on a support structure of the ultrasonic welding system; and
welding at least one conductive contact of the contact element of the workpiece to a conductive region of the base structure of the workpiece using a weld head assembly including an ultrasonic converter carrying a sonotrode to form an ultrasonic weld between the at least one conductive contact and the conductive region, the conductive contact having a thickness between 0.2-3 mm, the weld head assembly being moveable along a plurality of substantially horizontal axes, the sonotrode welding the at least one conductive contact of the contact element of the workpiece to the conductive region of the base structure of the workpiece during a welding operation at a bond force of between 5-500 kg, and with a sonotrode tip motion amplitude of between 5-150 microns, the ultrasonic weld having an area in a range between 1.5-30 $mm^2$.

2. The method of claim 1 wherein the welding step includes using at least one of linear ultrasonic motion and torsional ultrasonic motion of the sonotrode to form the ultrasonic weld.

3. The method of claim 1 wherein the welding step includes using linear ultrasonic motion of the sonotrode to form the ultrasonic weld.

4. The method of claim 1 wherein the welding step includes using torsional ultrasonic motion of the sonotrode to form the ultrasonic weld.

5. The method of claim 1 further comprising a step of providing the workpiece from an input workpiece supply, the input workpiece supply being configured to carry a plurality of workpieces.

6. The method of claim 5 further comprising a step of moving the workpiece from the input workpiece supply to the support structure.

7. The method of claim 1 further comprising a step of receiving the workpiece at an output workpiece supply after processing by the sonotrode.

8. The method of claim 1 wherein the plurality of substantially horizontal axes an x-axis and a y-axis of the ultrasonic welding system.

9. The method of claim 1 further comprising a step of clamping the workpiece to the support structure using a workpiece clamping system of the ultrasonic welding system during the welding step.

10. The method of claim 1 wherein the sonotrode is configured to operate at a frequency in a range between 15-40 kHz.

* * * * *